Figure 1:
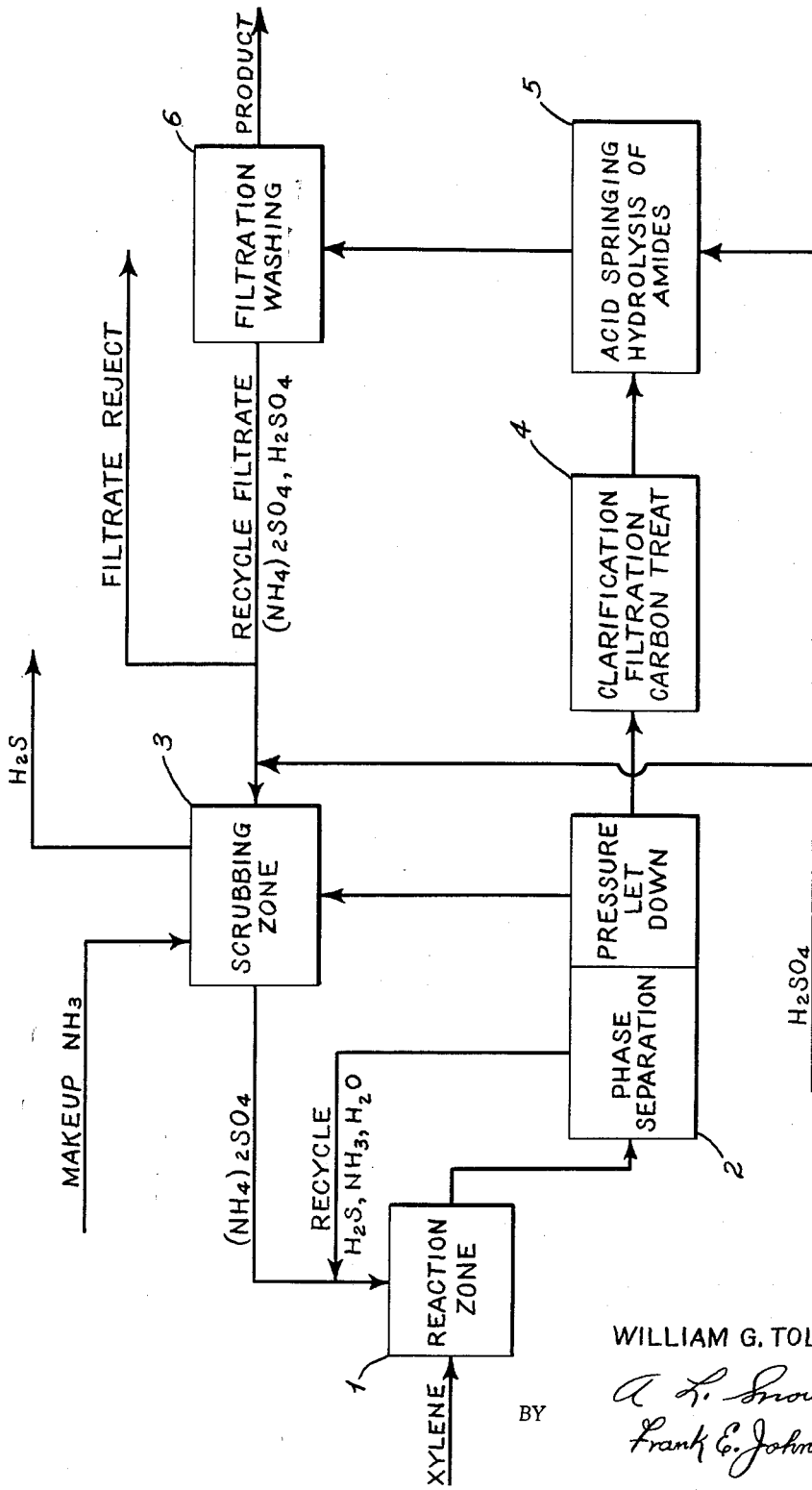

INVENTOR
WILLIAM G. TOLAND JR.
BY [signatures]
ATTORNEYS

United States Patent Office 2,722,549
Patented Nov. 1, 1955

2,722,549
OXIDATION PROCESS

William G. Toland, Jr., San Rafael, Calif., assignor to California Research Corporation, San Francisco, Calif., a corporation of Delaware Application July 30, 1953, Serial No. 371,209

3 Claims. (Cl. 260—524)

This invention relates to a process for oxidizing organic compounds.

This invention is a continuation-in-part of my copending application Serial No. 202,389, filed December 22, 1950.

Pursuant to the invention, an organic compound, a water-soluble sulfate, a water-soluble sulfide and water are introduced into a reaction zone and the mixture is there heated to an elevated temperature above 200° F. to effect oxidation of the organic compound.

All types of organic compounds appear to undergo oxidation when treated in this manner. Organic compounds containing at least one carbon-to-hydrogen bond and preferably at least one carbon-to-carbon bond, such as aliphatic hydrocarbons, aromatic hydrocarbons, amines, aldehydes, ketones, esters, organic acids and heterocyclic organic compounds are readily oxidized by the process of the invention. The process is especially effective for oxidizing hydrocarbons and organic compounds consisting of carbon, hydrogen and oxygen atoms.

Any inorganic sulfate may be employed in the oxidation process. However, it is preferred to employ water-soluble sulfates whose cations combine with sulfide ion to form water-soluble sulfides but water-insoluble sulfates of metals forming insoluble sulfides may be used effectively provided an excess of water-soluble sulfide is employed. Ammonium sulfate, alkali metal sulfates, the water-soluble alkaline earth metal sulfates, the alkali and alkaline earth hydrogen sulfates and sulfuric acid are especially suitable sulfates. Of the several preferred sulfates, ammonium sulfate has been found to be substantially more effective than the metallic sulfates and by its use optimum conversions and yields are obtained under any fixed set of reaction conditions. It is believed that the superior character of ammonium sulfate is related to the fact that the pH of the water solution of this sulfate and the sulfide or other sulfur compound containing sulfur at a valence below plus 6 is usually below 9 at room temperature. It has been noted that in comparable solutions where other sulfates are employed, pH values above 9 may be obtained and that the reaction proceeds less satisfactorily in these cases. In addition to this aspect ammonia liberated from amomnium sulfate during the reaction appears to solubilize hydrocarbon feeds and thus increase the intimacy of contact of the reactants.

Any water-soluble sulfide may be employed in the oxidation. Hydrogen sulfide, ammonium sulfide or ammonium polysulfide are preferred, especially when ammonium sulfate is employed as the oxidizing agent. Other sulfides such as the alkali metal sulfides and alkaline earth metal sulfides are fully operative. While water-soluble inorganic sulfides are preferred, organic polysulfides and water-insoluble sulfides which dissolve to an appreciable extent in hot aqueous ammonium sulfate, for example, ferrous sulfide, aluminum sulfide and cadmium sulfide and the like, can be used. As noted hereinafter, the effective oxidizing agent in the process of the invention is sulfate ion. It is most effective especially from the standpoint of rate when used in combination with a relatively large amount of water and a small amount of a water-soluble sulfide. The sulfide appears to function as an initiating reducing agent in the reaction.

The oxidation reaction is conducted at temperatures above 200° F. While there appears to be no upper temperature limit for the reaction, it is preferred to conduct the reaction at temperatures above 200° F. and below the critical temperature of water. More desirably, temperatures above 400° F. and below about 700° F. are employed, especially temperatures in the range from 550° F. to 675° F.

In the preferred embodiment of the invention, the oxidation reaction is conducted at an elevated pressure sufficient to maintain a part of the water introduced into the reaction zone in liquid phase, desirably at pressures in the range from 200 to 5000 p. s. i. g.

The vigor and completeness of the oxidation reaction increases with temperature and the completeness of the oxidation of the organic compound tends to increase with reaction time. Organic compounds differ appreciably in the ease with which they may be oxidized pursuant to the invention, some being rapidly and completely oxidized at temperatures below 500° F., while others require temperatures in the range from 600 to 700° F. if oxidation is to be accomplished in a reasonably short period.

The oxidation may be conducted either batchwise or in a continuous process. When batch operation is employed, the organic compound, the sulfate, the sulfide and water are introduced into a bomb or an autoclave which is then sealed and heated to reaction temperature with shaking to facilitate contact of the reactants. The size of the bomb is so related to the quantity of the reactants introduced that an autogenous pressure in the range 1000 to 4000 p. s. i. g. is built up insuring the presence of liquid water during the reaction. After the reactants have been held at reaction temperature for a time sufficient to effect the desired degree of oxidation of the organic compound, the bomb is cooled, depressured, and the reaction product removed. The reaction may also be run continuously, in which case a tubular reaction zone is employed. The reactants are passed through an elongated tube at reaction temperature and under an elevated pressure and the reaction products are continuously withdrawn from the reaction zone and purified.

Figure 1 of the appended drawings illustrates a preferred modification of the process of the invention. In starting the reaction, a hydrocarbon, for example, a xylene, ammonium sulfate, ammonium sulfide, and water are introduced into reaction zone 1. The reactants are heated in reaction zone 1 to a temperature in the range from 500 to 700° F. for a time sufficient to effect partial oxidation of the xylene. The reaction product is removed from reaction zone 1, either intermittently or continuously, and charged to cooling and depressuring zone 2. In zone 2 separation of liquid and vapor phase is effected and a portion of the vapor phase comprising hydrogen sulfide, ammonia and water vapor is returned to reaction zone 1 for use in oxidation of further quantities of xylene. The reaction mixture in zone 2 is depressured and the reaction product gases other than those which have been recycled are passed into scrubbing zone 3 where the gas is scrubbed with sulfuric acid to remove ammonia and to form ammonium sulfate. The liquid product is removed from zone 2 and passed into clarification zone 4 where it is mixed with a small quantity of adsorbent charcoal and filtered to remove any color bodies which may have been formed. The filtrate from zone 4 is passed into hydrolysis zone 5 where it is treated with a strong acid, preferably sulfuric acid, and heated to hydrolyze acid amides and to liberate free phthalic acids from ammonium phthalates contained in the filtrate. The acidified liquid product is passed from zone 5 to filtration zone 6 where it is filtered to recover a filter cake comprising phthalic acids. At least part of the filtrate from zone 6 comprising ammonium sulfate and sulfuric acid is passed into scrubbing zone 3. Make-up ammonia is also introduced into scrubbing zone 3, the proportions of fresh ammonia, scrubbed ammonia and sulfuric acid being adjusted to yield an approximately neutral solution of ammonia sulfate which is recycled to reaction zone 1.

Figure 2:
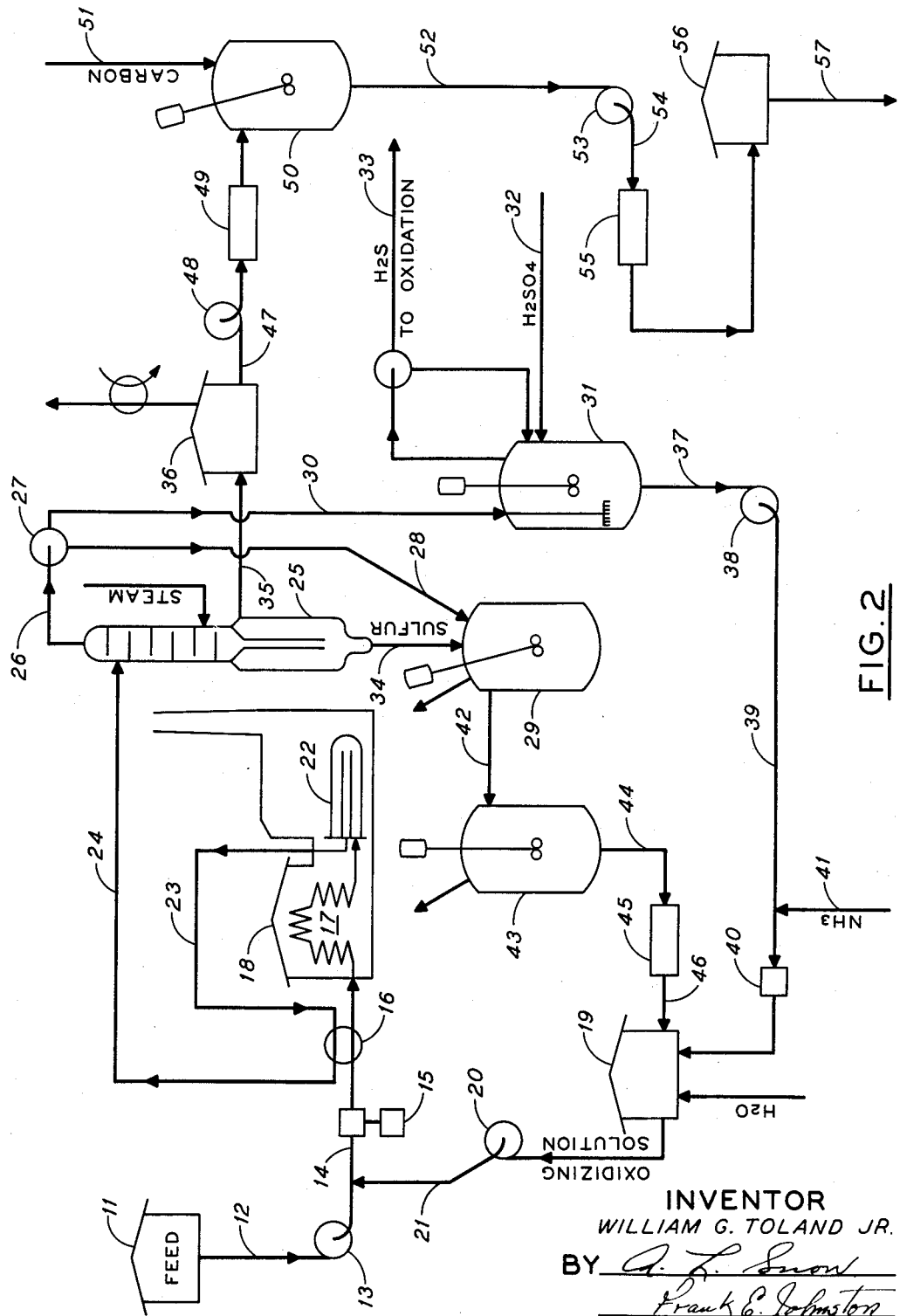

Figure 2 of the appended drawings is a diagrammatic illustration of apparatus and process flow which has been found completely adequate for the practice of the invention on a pilot plant scale. When the oxidation of meta-xylene to isophthalic acid is undertaken using the arrangement of apparatus shown in Figure 2, meta-xylene is withdrawn from storage tank 11 through line 12 at the rate of 56 pounds per hour and pumped by pump 13 through line 14, booster pump 15 and heat exchanger 16 into heating coil 17 in the interior of furnace 18. An oxidizing solution is withdrawn from storage tank 19 and forced by pump 20 through line 21 into line 14, where it mixes with the xylene and passes into heating coil 17. The oxidizing agent consists of ammonium sulfate, ammonium polysulfide and water. These materials are introduced into line 14 at the rate of 123 pounds of ammonium sulfate per hour, 314 pounds of water per hour, and 14.8 pounds of ammonium polysulfide per hour. The ammonium polysulfide is composed of 8.8 pounds of ammonium sulfide and 6 pounds of elemental sulfur. In heating coil 17 the mixture of xylene and oxidizing agent is heated to about 630° F. The hot mixture passes from heating coil 17 to a "soaking" coil 22 where the temperature of the mixture is maintained at about 630° F. and then passes out of furnace 18 through line 23, heat exchanger 16 where it is in indirect heat exchange with fresh feed and the oxidizing agent, through line 24 into stripper 25. The residence time of the mixture of xylene and oxidizing agent in the furnace is about 35 to 40 minutes. When a xylene feed having a substantial p-xylene content is being oxidized it is desirable to insert a high temperature surge drum in line 24. The product is held in this drum at 300–500° F. for 10 to 30 minutes during which a moderate amount of vapor is bled from the drum. This treatment reduces the content of sparingly soluble diamides in the oxidation product. In stripping zone 25 the reaction product mixture is stripped with steam to remove carbon dioxide, hydrogen sulfide, ammonia and some water overhead through line 26. The overhead product passes through condenser 27 where a liquid condensate consisting principally of aqueous ammonium sulfide is formed. This condensate is withdrawn through line 28 and passed into a first sulfur dissolving vessel 29. 8.9 pounds of ammonium sulfide and 61 pounds of water pass through line 28 into sulfur dissolving vessel 29 each hour. The uncondensed portion of the overhead passes from condenser 27 through line 30 into scrubber 31. 4 pounds of water, 13.5 pounds of carbon dioxide, 16 pounds of ammonia and 31 pounds of hydrogen sulfide pass through line 30 into scrubber 31 each hour. Sulfuric acid is introduced into scrubber 31 through line 32. The hourly flow through line 32 is 46 pounds of sulfuric acid, 216 pounds of water and 61 pounds of ammonium sulfate. In the usual practice of the invention, the meta-xylene is oxidized to isophthalic acid which appears in the primary reaction product in the form of ammonium salts and amides. This salt-amide product is hydrolyzed by contacting it with a molar excess of sulfuric acid to liberate isophthalic acid. The hydrolysis product is filtered to recover isophthalic acid as the filter cake and an aqueous filtrate containing ammonium sulfate and sulfuric acid. This filtrate is introduced into scrubber 31 through line 32 and contains sufficient sulfuric acid to scrub ammonia from the gas stream entering scrubber 31 through line 30. The sulfuric acid and gases are intimately mixed in scrubber 31 where the ammonia contained in the gases is converted to ammonium sulfate. Unabsorbed gases are withdrawn from scrubber 31 through line 33. 31 pounds of hydrogen sulfide, 13.5 pounds of carbon dioxide and about 0.8 pound of water are withdrawn from scrubber 31 through line 33 each hour. The hydrogen sulfide withdrawn is oxidized to sulfuric acid which is then used to hydrolyze the salt-amide product and returned to the process by introducing it into scrubber 31 through line 32.

Aqueous ammonium sulfate is withdrawn from scrubber 31 through line 37. 119 pounds of ammonium sulfate and 219 pounds of water are withdrawn from scrubber 31 through line 37 each hour. The effluent from scrubber 31 is forced through line 39 and filter 40 into storage tank 19 by pump 38. Ammonia is introduced into line 39 through line 41 at the rate of one pound per hour to neutralize residual sulfuric acid in the effluent from scrubber 31.

The stripped oxidation reaction product accumulates in the lower portion of stripper 25 where a lower liquid sulfur phase and an upper aqueous phase containing phthalic acid values separate. The aqueous phase is withdrawn from stripper 25 through line 35 and passed into surge tank 36. Liquid sulfur is withdrawn from the bottom of stripper 25 through steam-traced line 34 and passed into sulfur-dissolving vessel 29 where it is intimately contacted with aqueous ammonium sulfide. The liquid mix is withdrawn from sulfur dissolver 29 through line 42 and passed into a second sulfur dissolving vessel 43 where the liquid is further agitated to complete the dissolving of the elemental sulfur in ammonium sulfide. Ammonium polysulfide is withdrawn from dissolving vessel 43 through line 44 and passed through filter 45 and line 46 into storage tank 19. 8.8 pounds of ammonium sulfide, 6.1 pounds of sulfur and 61 pounds of water pass through line 46 into storage tank 19 each hour, the ammonium sulfide and sulfur being in the form of ammonium polysulfide. The aqueous phase of the reaction product passing into surge tank 36 through line 35 contains the phthalic acid values produced during the oxidation step. The aqueous mixture flowing into surge tank 36 each hour contains 0.15 pound of ammonium sulfate, 326 pounds of water, 27 pounds of ammonium isophthalate, 43 pounds of isophthalic acid monoamide, 8 pounds of isophthalic acid diamide, 4 pounds of ammonium orthophthalate, 1.4 pounds of ammonium benzoate and .8 pound of ammonium toluate. The ammonium orthophthalate and ammonium benzoate are produced by oxidation of ortho-xylene and ethyl benzene contained in the xylene feed. It will be noted that the sulfate content of the oxidation reaction product is very low, essentially all of the sulfate having been reduced as it oxidized the xylene feed.

The aqueous phase recovered from stripper 25 is passed from surge tank 36 through line 47 and pumped by pump 48 through filter 49 into vessel 50. Activated charcoal is added to vessel 50 through line 51 at the rate of 1.3 pounds per hour. The activated carbon is intimately mixed with the aqueous liquid in vessel 50 and then withdrawn from vessel 50 through line 52 and pumped by pump 53 through line 54 and filter 55 where the carbon and color bodies contained in the aqueous liquid are removed into storage tank 56.

The clear aqueous liquid is withdrawn from storage tank 56 through line 57 and conducted to hydrolysis and purification of the phthalic acid.

The following examples illustrate in detail the manner in which alkyl aromatic hydrocarbons may be oxidized to produce aromatic carboxylic acids by the process of the invention.

EXAMPLE 1

The apparatus employed in this experiment was a stainless steel bomb having a capacity of 4.5 liters. The bomb was fitted with a pressure gauge, a thermowell, a bursting disk, a bleed line and valve, and a shaker. 160 g. of para-xylene (98.8% para-), 305 g. of ammonium sulfate, 4.65 moles of ammonium sulfide in water solution having a volume of 700 cc., and 1150 cc. of water were introduced into the bomb. The bomb was sealed and heated to 600° F. and held at that temperature for one hour. The bomb was then cooled to room temperature, opened, and the reaction product was removed. The reaction product was stripped with steam, and filtered to remove approximately 1 g. of sulfur. The filtrate was acidified with hydrogen chloride to precipitate the insoluble organic acids, and filtered. The filter cake was washed and dried. 69 g. of unreacted para-xylene were recovered during the steam stripping step. The filter cake weighed 102 g., had a neutral equivalent of 131, and a saponification equivalent of 113. The solid product consisted of terephthalic acid, toluic acid, and amides of both acids. The acid products contained 47% by weight of phthalic acids and their derivatives and 53% of toluic acids and their derivatives.

EXAMPLE 2

The procedure followed in Example 1 was repeated. The amounts of the reactants employed were the same. The only difference in the procedure was that the bomb was heated to 600° F. and held at that temperature for a period of 6 hours.

The filter cake recovered in this experiment weighed 240.6 g., had a neutral equivalent of 109 and a saponification equivalent of 81.8. The filter cake consisted essentially of terephthalic amides and acid.

The filtrate obtained in this experiment was evaporated and the residue was extracted with chloroform. The chloroform was evaporated and 10 g. of white solid material were recovered. This material consisted of toluic and benzoic acids.

The yield of phthalic acid was 96.2% of theory.

EXAMPLE 3

The apparatus employed in Example 1 was used in this experiment. The charge to the bomb consisted of 1 mole of para-xylene, 218 g. of ammonium sulfate, 800 cc. of water and 200 g. of hydrogen sulfide. The bomb was heated to a temperature of 600° F. and held at a temperature in the range from 583 to 606° F. for a period of 1½ hours. During this period the pressure in the bomb varied between 2400 and 2800 p. s. i. g. The bomb was cooled to room temperature and opened. When the bomb was opened, the gases escaping from the bomb were passed through a caustic scrubber. The scrubber showed a gain in weight of 200 g. when the passage of the gases from the bomb through it had been completed. This increase in weight is due almost entirely to absorption of hydrogen sulfide.

The liquid product was steam-stripped and filtered to remove sulfur. This filtrate was acidified with hydrochloric acid to precipitate phthalic acids. The acidified filtrate was filtered and the phthalic acid filter cake was washed and dried. The dry weight of this filter cake was 158 g. The filter cake had a neutral equivalent of 103 and a saponification equivalent of 82.8. The yield of phthalic acids was 149 weight per cent of the para-xylene charged.

EXAMPLE 4

The data from additional runs in which the specific composition of the oxidizing agent is varied are summarized in the following Table I.

Table I

| Run No. | Compound Oxidized | Oxidizing Agent | Total $H_2O$, cc. | Temp., °F. | Time, Hours | Pressure, p. s. i. g. | Products | Conversion, Mole Percent | Yield, Wt. Percent |
|---|---|---|---|---|---|---|---|---|---|
| 660-1 | Toluene (1 mole) | $NH_4HSO_4$ (1.5 moles) | 700 | 600 | 1.0 | 1,800 | Benzoic Acid | 8 | Low |
| 721/16 | Para-xylene (1.5 moles) | $H_2S$ (4.64 moles) / $(NH_4)_2SO_4$ (2.3 moles) / $NH_3$ (8.9 moles) | 1,850 | 600 | 1.0 | 2,800 | Terephthalic Acid NE 88.9 and Toluic Acid | 89 | 128 |
| 721/20 | do | $(NH_4)_2S$ {6.3 moles $NH_3$ / 3.3 moles $H_2S$} / $Na_2SO_4$ (4.6 moles) | 2,000 | 600 | 1.0 | 2,550 | Terephthalic Acid NE 118 and Toluic Acid | 7.0 | 67 |

EXAMPLE 5

A number of pilot scale runs were made oxidizing mixtures of meta- and para-xylenes. The xylene feeds contained varying amounts of ortho-xylene, ethyl benzene and paraffins. Under the conditions of the reaction, the paraffins are oxidized principally to carbon dioxide and the quantity of oxidizing agent employed was adjusted to be sufficient to accomplish substantially complete conversion of the xylenes in addition to essentially complete oxidation of the paraffin and ethyl benzene impurities. The mixture of oxidizing agent and xylene in these runs was passed through a preheat section made up of 60 ft. of ¾ inch steel pipe and then through a reactor section consisting of 420 ft. of ¾ inch steel pipe. The data of representative runs are summarized in the following Table II.

Table II

| Run No. | Hours on Stream | Oxidizing Mixture | | | | Xylene | | Molar Feed Ratio |
|---|---|---|---|---|---|---|---|---|
| | | $(NH_4)_2SO_4$ | $H_2S$ | $(NH_4)_2S_x$ | Vol. Percent in Blend | Isomer Ratio, m-p | Approx. Feed Rate, cc./min. | Xylene:$(NH_4)_2SO_4$: $H_2S$ or $(NH_4)_2S_x$:$H_2O$ |
| 1 | 0.75 | √ | √ | | | 85-15 | 55 | 1:1.63: .71:24.6 |
| 6 | 4.5 | √ | | √ | 8 | √ | √ | 1:1.59: .16:27 |
| 10 | 3 | √ | | √ | 2 | √ | | 1:1.61: .04:25 |
| 20 | 0-4 | √ | | √ | 8 | √ | 35 | 1:1.83: .18:30 |
| 25 | 21-25 | √ | √ | | | √ | 70 | 1:1.81:.731:27 |

| Run No. | Reaction Conditions | | | Feed Quantities | | | Product Work-up and Yields | | | | |
|---|---|---|---|---|---|---|---|---|---|---|---|
| | Temp. Range, °F. | Pressure, p. s. i. | Est. Residence Time (min.) | Oxidizing Solution, Lbs. | Xylene | | Conversion | Acid No. | Mole Yields | | Percent Carboxyl as Amide Groups |
| | | | | | Lbs. | Space Velocity V./V./Hr. | | | Phthalics | Toluics | |
| 1 | 595-630 | 3,000 | 58 | 29.7 | 4.8 | 0.10 | 99 | 393 | 67.6 | 12.3 | |
| 6 | 628-631 | √ | √ | 94.7 | 14.5 | √ | 97 | 673 | 89.7 | .7 | 34 |
| 10 | 624-628 | √ | ~140 | 59.0 | 9.51 | 0.044 | 97 | 673 | 86.0 | 0.9 | 39 |
| 20 | 612-617 | 2,800 | 120 | 100 | 13.4 | 0.046 | 97.0 | 673 | 91.4 | .9 | |
| 25 | 636-637 | 2,500 | 60 | 213.5 | 31.1 | 0.1078 | 97.8 | 668 | 92.5 | 3.4 | 42 |

EXAMPLE 6

A further series of runs was made in a larger pilot unit corresponding to Figure 2 of the appended drawings. The data of these runs were summarized in the following Table III.

Table III

| Run No. | Hours Run | Oxidizing Mixture | | | | | Hydrocarbon Composition, Vol. Percent | | | | | Molar Feed Ratio | | | | |
|---|---|---|---|---|---|---|---|---|---|---|---|---|---|---|---|---|
| | | $(NH_4)_2SO_4$ | $(NH_4)_2S$ | $(NH_4)_2S_x$ | Molten Sulfur | Percent Free Sulfur by Wt. | o-xylene | m-xylene | p-xylene | ethyl benzene | Paraffins | Hydrocarbon | Ammonium Sulfate | Ammonium Sulfide | Free Sulfur | Water |
| 29 | 4 | √ | | √ | | √ | 0.3 | 1.4 | 95.7 | 1.0 | 1.6 | 1 | 1.63 | .16 | .16 | 57 |
| 29 | 3 | √ | | √ | | √ | √ | √ | √ | √ | √ | 1 | 1.57 | .16 | .16 | 59 |
| 30 | 4 | √ | | √ | | √ | √ | √ | √ | √ | √ | 1 | 1.55 | .16 | .16 | 32 |
| 31 | 4 | √ | √ | | | 0.0 | √ | √ | √ | √ | √ | 1 | 1.64 | .16 | 0.0 | 33 |
| 32 | 4 | √ | | √ | | √ | √ | √ | √ | √ | √ | 1 | 1.62 | .16 | .16 | 32 |
| 35 | 4 | √ | √ | | | 0.0 | √ | √ | √ | √ | √ | 1 | 1.59 | .16 | 0.0 | 33 |
| 35 | 4 | √ | | √ | √ | 2.2 | √ | √ | √ | √ | √ | 1 | 1.60 | .16 | .36 | 33 |

| Run No. | Temp., °F. | Pressure, p.s.i.g. | Feed Quantities | | | | | Product Work-up, Yields and Analyses | | | | | |
|---|---|---|---|---|---|---|---|---|---|---|---|---|---|
| | | | Additional water, lbs. | Oxid. soln., lbs. | Hydrocarbon | | | Hydrocarbon Conversion, Percent | Product Acid No. | Mole Percent Yield | | | |
| | | | | | lbs. | Space Velocity, V./V./hr. | | | | o-PAc | M-P PAc | Toluics | Benzoic |
| 29 | 633 | 3,000 | 172 | 210 | 31.8 | 0.120 | | 100 | 674 | | 84.4 | | |
| 29 | 629 | 2,950 | 186 | 199 | 31.5 | 0.170 | | 100 | 665 | | 89.0 | | |
| 30 | 632 | 3,000 | 44.7 | 216 | 34.3 | 0.121 | | 99.7 | 674 | 70.4 | 87 | 5.6 | 10.4 |
| 31 | 628 | 3,000 | 42.7 | 206 | 31.7 | 0.115 | | 100.0 | | | | | |
| 32 | 635 | 3,000 | 56.1 | 277.2 | 42.4 | 0.152 | | 100 | 675 | | 85 | | |
| 35 | 623 | 3,000 | 44.9 | 205 | 31.8 | 0.112 | | 100.0 | 673 | | 74 | 0.2 | |
| 35 | 620 | 3,100 | 57.4 | 275.5 | 42.3 | 0.153 | | 100.0 | 673 | | 87.1 | 1.7 | |

EXAMPLE 7

A number of representative organic compounds was oxidized by heating them to temperatures in the range from 400 to 700° F. with a water-soluble sulfate, a water-soluble sulfide and water pursuant to the invention. The organic compound, temperature of reaction, and products obtained are summarized in the following Table IV. The acid products listed are recovered by springing the acid from the salts and amides in the crude reaction product with a strong mineral acid.

Table IV

| Material | Temperature, °F. | Reaction Product |
|---|---|---|
| Toluic acids | 545 | Phthalic acids. |
| Caproic acid | 535-590 | Carbon dioxide. |
| Tetrahydrofuran | 530-575 | Do. |
| Do | 450 | Acetic acid, succinic acid, butyric acid, $CO_2$. |
| Acetophenone | 580 | Benzoic acid. |
| Do | 450 | Phenylacetic acid. |
| Cyclohexanone | 555 | Phenol and $CO_2$. |
| α-methyl naphthalene | 575-590 | α-naphthoic acid. |
| p-tertiary-butyl toluene | 550-600 | p-tertiary-butyl benzoic acid. |
| Toluene | 600 | Benzoic acid. |
| Mesitylene | 660 | Trimesic acid. |
| Pseudocumene | 600 | Orthophthalic, isophthalic and terephthalic acids. |
| m-cymene | 600 | Isophthalic acid. |
| Benzyl alcohol | 600 | Benzoic acid. |
| Durene | 580-600 | Iso-terephthalic acids. |
| 2,3-dimethyl butane | 600 | $CO_2$, iso-butyric acid. |
| n-hexane | 600 | $CO_2$, lower aliphatic acids. |
| n-octane | 600 | Lower aliphatic acids (NE 75-154). |
| 2,2,4-trimethyl pentane | 600 | Trimethyl acetic acid. Trimethyl propionic acid. |
| 2,2,5-trimethyl hexane | 600 | Trimethyl acetic acid. Trimethyl propionic acid. |
| Diamyl sulfide | 600 | Mixed acids, predominantly valeric acid (NE 95-110). |
| t-butyl p-xylene | 630 | t-butyl terephthalic acid. |
| Di-isobutylene | 600 | Trimethyl acetic acid. Trimethyl propionic acid. |
| Hemimellitene | 600 | Phthalic acids. |
| Methanol | 400-600 | $CO_2$. |
| Trimethylamine | | Methyl mercaptan, $CO_2$. |
| Dodecene (propylene polymer) | | Aliphatic acids (NE 234.8). |
| t-butyl meta xylene | 600-630 | t-butyl isophthalic acid. |
| Sucrose | | Acetic acid, $CO_2$. |
| n-butane | | Do. |
| CH(OSN) | | CHOS. |
| Benzene | 650 | CO, $CO_2$. |
| Methane | 620 | CO, $CO_2$. |
| p-toluene sulfonic acid | 600 | p-sulfobenzoic acid. |
| Nitrobenzene | 620 | |
| Benzylamine | 600 | Benzoic acid. |

| Material | Temperature, °F. | Reaction Product |
|---|---|---|
| Nitrotoluene | 600 | Carbonaceous. |
| p-chlorotoluene | 600 | $CO_2$, heavy products. |
| Tetrahydrofurfuryl alcohol | 620-640 | Glutaric acid. |
| Ethyl mercaptan | 600 | Acetic acid. |
| Ethylene | 600 | Do. |
| Propylene | 600 | Propionic acid. |
| Cyclohexane | 550 | Succinic acid and lower aliphatic acids. |
| Cyclohexene | 450 | Phenol quinone, hydroquinone. |
| n-butanol | 600 | Acetic, propionic, butyric acids. |

EXAMPLE 8

135 g. of meta-xylene, 188 g. of aluminum sulfate, 1375 g. of water and 41 g. of hydrogen sulfide were charged to a 4.5 liter autoclave. The autoclave was sealed and the mixture was heated to 600° F. and then shaken for one hour. The autoclave was cooled and the gases were bled through a caustic scrubber where carbon dioxide was recovered. The liquid products contained 50.4 g. of unreacted xylene. The water layer of the liquid product had a pH 2 and a strong odor of hydrogen sulfide. The water layer was filtered and a wet cake weighing 209 g. was obtained. The filter cake was digested with sodium hydroxide and water and filtered. The filtrate was acidified to pH 5 and then filtered hot. The filtrate was then acidified to pH 1 with concentrated hydrochloric acid to precipitate organic acids. A light gray precipitate was obtained which has a neutral equivalent of 121.4 and consisted principally of benzoic acid.

EXAMPLE 9

106 g. of a mixture of meta- and para-xylenes containing 85% meta-xylene, 34 g. of hydrogen sulfide, 212 g. of lithium sulfate monohydrate and 960 cc. of water were charged to a 2.5 liter autoclave. The autoclave was sealed and heated to 620° F. for one hour. The autoclave was cooled and gases were bled through a caustic scrubber where carbon dioxide was recovered. The liquid product contained 89 g. of unreacted xylene. The water phase of the liquid product was treated substantially as in Example 1. An organic acid solid phase which had a neutral equivalent of 162.5 was precipitated. The acid was principally toluic acid.

EXAMPLE 10

Example 9 was repeated, substituting 251 g. of ferrous sulfate for the lithium sulfate of Example 9. The liquid product contained 46 g. of unreacted xylene. An organic acid phase having a neutral equivalent of 128.2 was recovered from the aqueous phase of the liquid product. The acid was principally a mixture of benzoic and toluic acids.

As indicated above, the process of the invention is conducted at elevated temperatures. A temperature above 400° F. is desirable if reasonable reaction rates are to be obtained with most organic compounds. Preferably, higher temperatures in the range from 500 to 700° F. are employed to obtain high conversions in reasonably short periods of time. Most desirably, the reaction is conducted at temperatures in the range from about 575 to 650° F. Where xylene feed is to be oxidized, it appears that the optimum temperature for the reaction is in the range from about 620 to 650° F.

The reaction is conducted under a superatmospheric pressure sufficient to maintain a substantial proportion of the water in liquid phase. Where batch operation is employed, the autogenous pressure built up in a sealed reaction vessel is a satisfactory pressure, it being understood that the quantity of reactants charged be so related to the volume of the reaction vessel that all of the water cannot exist in vapor phase. When the process is conducted continuously by passing the reaction mixture through a tubular reaction zone, the pressure in the tubular reactor is controlled by valves and held at a level in the range from 1000 to 5000 p. s. i. g. or, more desirably, in the range from 2000 to 3500 p. s. i. g.

The net reaction when xylenes are oxidized is shown by the following equation:

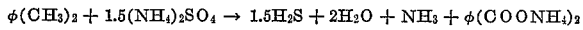

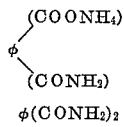

$\phi(CONH_2)_2$

The mixture of ammonium phthalate, ammonium phthalate monoamide and phthalic diamide aggregates 1 mole in the above equation.

As indicated by the above equation, 1.5 moles of ammonium sulfate are required to oxidize 1 mole of xylene to a phthalic acid product, (i. e., 0.75 mole of sulfate oxidizes one methyl group to a carboxyl group). A molar excess of ammonium sulfate is desirably employed and ordinarily from about 1.55 moles to 1.75 moles of ammonium sulfate are charged to the reaction for each mole of xylene fed. Xylene feeds may commonly contain 5 to 10% of paraffinic hydrocarbons and, where paraffins are present, larger amounts of ammonium sulfate will be required to achieve complete conversion of the xylene, since the paraffin oxidation consumes a relatively larger amount of oxidizing agent.

While the above equation does not show water as a material participating in the reaction, the presence of water in considerable amount is necessary for good conversions and yields. For good operation it is desirable to charge at least 25 moles of water per mole of organic compound to the reaction zone. 30 to 60 moles of water per mole of hydrocarbon facilitate good conversions and yields. Even larger amounts of water may be employed, the only adverse effect being that a larger proportion of the available reaction space is occupied by the water so that the throughput of feed per unit volume of reaction space is lower.

The sulfide component of the reaction mixture serves to increase the rate of reaction. The effective oxidizing agent of course is the sulfate ion, but its effectiveness, especially from the standpoint of rate, is markedly increased by the sulfide. The amount of sulfide charged to the reaction zone is desirably in the range from 0.05 to 0.3 mole per mole of organic compound, and preferably in the range from 0.2 to 0.25 mole per mole of organic feed. Optimum proportions of reactants when a xylene is being oxidized are 1.6 to 1.7 moles of ammonium sulfate per mole of xylene, 30 to 40 moles of water per mole of xylene, and 0.2 to 0.3 mole of sulfide per mole of xylene. When the sulfide employed is ammonium polysulfide, about .25 mole of ammonium polysulfide containing about .38 gram atoms of sulfur per mole of xylene appears to be optimum.

I claim:

1. A process for producing phthalic acids which comprises contacting xylenes with ammonium sulfate, ammonium polysulfide and water in a reaction zone at a temperature in the range 550 to about 650° F. under a superatmospheric pressure sufficient to mantain a part of the water in liquid phase, the mole ratio of sulfate to xylene being in the range of about 1.55:1 to 1.75:1 and the mole ratio of polysulfide to xylene being in the range of about 0.05:1 to 0.3:1.

2. The method as defined in claim 1, wherein the xylene is meta-xylene.

3. The method as defined in claim 1, wherein the xylene is para-xylene.

No references cited.